UNITED STATES PATENT OFFICE.

PROSPER MONNET, OF LYONS, FRANCE, ASSIGNOR TO GILLIARD, P. MONNET & CARTIER, OF SAME PLACE.

ANISOLIN AND PROCESS OF MAKING IT.

SPECIFICATION forming part of Letters Patent No. 499,927, dated June 20, 1893.

Application filed April 13, 1892. Serial No. 428,961. (Specimens.) Patented in France September 28, 1891, No. 216,407, and in England March 9, 1892, No. 4,677.

*To all whom it may concern:*

Be it known that I, PROSPER MONNET, a citizen of the French Republic, residing at Lyons, France, have invented certain new and useful Improvements in Coloring-Matters and their Manufacture, (for which patents have been granted in France, No. 216,407, dated September 28, 1891, and in Great Britain, No. 4,677, dated March 9, 1892,) of which the following is a specification.

My invention relates to the manufacture or production of a certain new class of coloring matters or dyes known as "anisolins" from the compounds known as "rhodamins," which latter may be prepared by several well known processes and form salts, the general formula of which is:

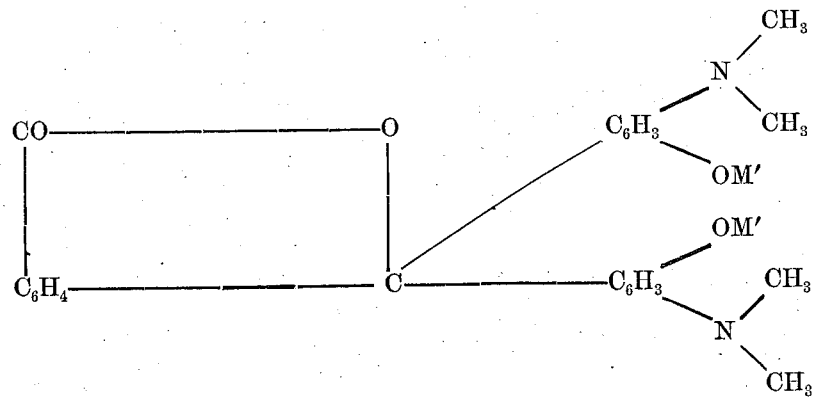

(M' designating a monovalent metal.)

It is by the substitution for the metal of the above formula of a simple alcoholic radical such as ethyl ($C_2H_5$), methyl ($CH_3$), amyl ($C_5H_{11}$), &c., or of a compound alcoholic radical, such as benzyl ($C_6H_5CH_2$) that I have succeeded in producing my new coloring matters or dyes, the constitution of which is:

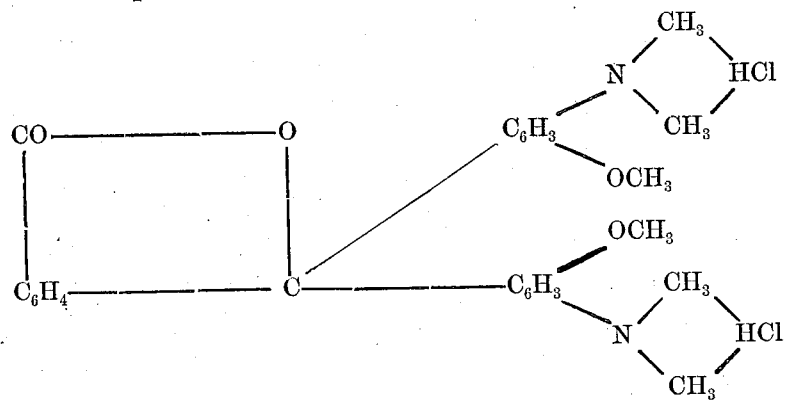

These coloring-matters have received the name anisolins on acccount of their analogy with anisols which are phenols wherein the H of the hydroxyl is replaced by the alcoholic radical $CH_3$, thus:—

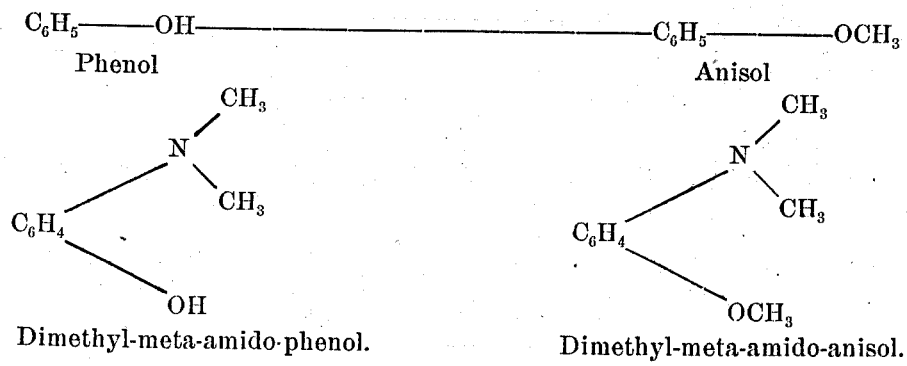

Phenol — Anisol

Dimethyl-meta-amido-phenol. — Dimethyl-meta-amido-anisol.

The dimethyl-meta-amido-phenol enters into the constitution of the rhodamins and the dimethyl-meta-amido-anisol into that of the anisolins, thus—

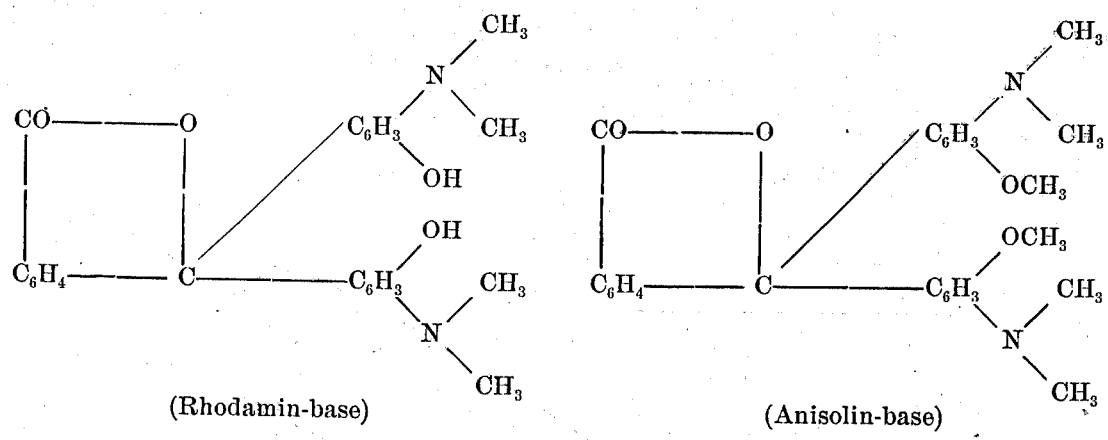

(Rhodamin-base) — (Anisolin-base)

*Example of the preparation of a potassium salt of a rhodamin.*—The hydrochlorate of dimethyl-meta-amido-phenol-phtalein is transformed into a potassium salt represented by the following formula—

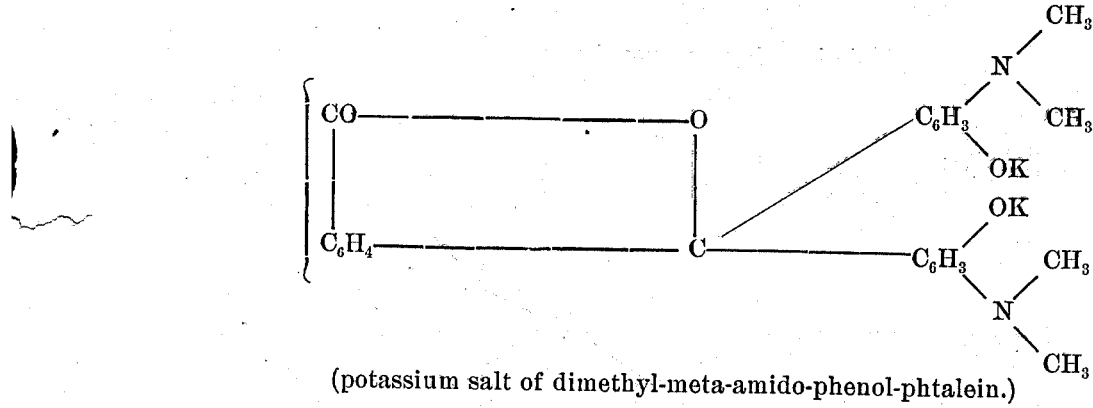

(potassium salt of dimethyl-meta-amido-phenol-phtalein.)

in the following manner: Ten kilograms of hydrochlorate of dimethyl-meta-amido-phenol-phtalein are dissolved in fifty liters of boiling water, and the resulting solution is poured into another boiling solution of five kilograms of caustic potash in twenty liters of water. The potassium salt is immediately precipitated in a crystalline form, more soluble in cold than hot solution; it is separated by filtration of its boiling solution, drained and dried. About ten kilograms of the potassium salt is obtained.

*Transformation into anisolin.*—Six kilograms of the potassium salt of dimethyl-meta-amido-phenol-phtalein or the corresponding quantity of a salt of another amido-phenol-phtalein, or meta-amido-cresol-phtalein, dimethylated or diethylated, &c., twenty kilograms of ethyl alcohol at 93° centesimal and three kilograms of chlorid of ethyl or its equivalent of chlorid of methyl, or of a chlorid or iodid or the equivalent of chlorid of benzyle, or in fact any haloid alcoholic salt are heated under pressure for four hours at a temperature in excess of 100° centigrade, preferably at about 120°. After cooling, the product, withdrawn from the autoclave is diluted with water, distilled to drive off the excess of chlorid and to extract the alcohol, and then there is added the amount of hydrochloric acid necessary to form the salt of anisolin, after which it is precipitated with sea salt. The separated salt of anisolin may then be separated and further purified by crystallization or precipitation. Generally, the iodids and bromids being little soluble, crystallize; the more soluble chlorids are dried after precipitation and form greenish spangles of metallic luster, very soluble in water. Under the same conditions, alcoholic chlorids, bromids and iodids, either simple or compound, are capable of a reaction not only on the condensation products of phtalic acid with the alkalized amido-phenols or amido-cresols, but also on those in which phtalic acid is replaced by succinic suberic, &c., acids, to produce equally new coloring matters or dies.

Having thus described my invention, I claim—

1. The herein described method of substituting an alcoholic radical for the metal of a rhodamin salt, which consists in mixing together an alcoholic haloid salt, a rhodamin salt and an alcohol, and heating the mixture until the reaction is effected, substantially as set forth.

2. The herein described method of substituting an alcoholic radical for the metal of a rhodamin salt, which consists in mixing together an alcoholic chlorid or its specified equivalent, a rhodamin salt, and ethyl alcohol, and heating the mixture until the reaction is effected, then diluting, then distilling in order to drive off the excess of chlorid and alcohol, then adding hydrochloric acid, and finally precipitating with salt, whereby a coloring matter or dye is produced, substantially as set forth.

3. The herein described method of producing a new coloring matter or dye which consists in mixing together ethyl alcohol, a potassium rhodamin salt, and a simple or compound alcoholic chlorid, then heating said mixture under pressure at a temperature exceeding 100° centigrade until a reaction is effected, then diluting with water, then distilling in order to separate the alcohol and drive off the excess of chlorid of ethyl, then adding hydrochloric acid, whereby hydrochlorate of anisolin is formed, and then precipitating said hydrochlorate with sea salt, substantially as set forth.

4. The new product or coloring matter having the formula:—

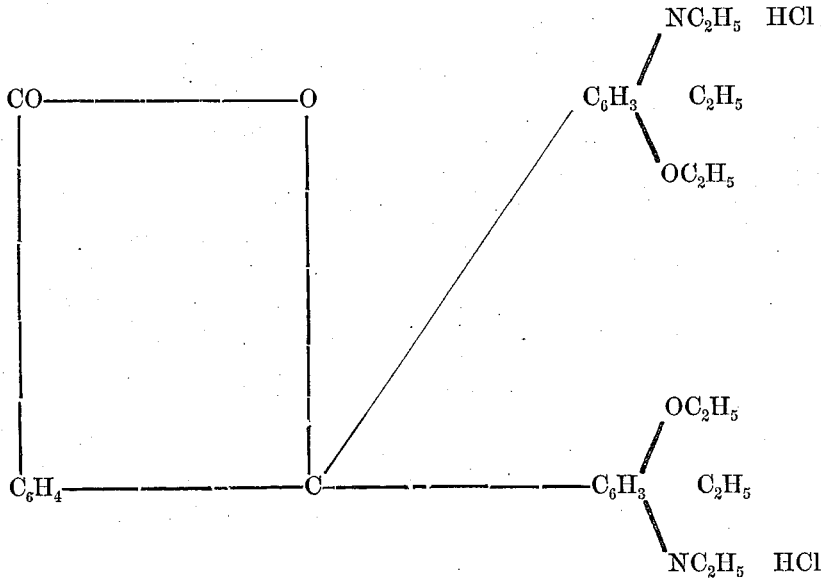

said product being a reddish brown amorphous powder, soluble in water with strong affinity for fibers, and dyeing cotton without a mordant.

In witness whereof I have hereunto signed my name in the presence of subscribing witnesses.

PROSPER MONNET.

Witnesses:
HENRY W. MARTIN,
PIERRE CARTIER,
GEO. D. FAIRFIELD.